Feb. 26, 1952 K. R. WENDT 2,587,420

LINEARITY CONTROL FOR CATHODE-RAY TUBES

Filed Aug. 31, 1948

Inventor

Karl R. Wendt

By [signature]

Attorney

Patented Feb. 26, 1952

2,587,420

UNITED STATES PATENT OFFICE 2,587,420

LINEARITY CONTROL FOR CATHODE-RAY TUBES

Karl Rinner Wendt, Hightstown, N. J., assignor to Radio Corporation of America, a corporation of Delaware Application August 31, 1948, Serial No. 46,962

14 Claims. (Cl. 315—9)

This invention relates to linearity control for deflecting arrangements in cathode ray tubes, for instance kinescopes or camera tubes. It relates more particularly to small controllable variations in linearity for improving registry of the scanning patterns for a plurality of such tubes. The invention is especially useful in connection with the deflecting coils of three kinescopes for simultaneous color television.

My copending application Ser. No. 46,963 filed August 31, 1948, and issued May 8, 1951 as Patent No. 2,552,357, discloses means for registering the four corners of scanning patterns, and also circuit connections for avoiding misregistry within the four corners of the resulting pattern. However, there are some causes of misregistry within the pattern that are unpredictable and this invention provides individual correction thereof for each cathode ray tube. For example, the "Q" of the deflecting coils may differ somewhat due to manufacturing variations in the coils or to the loading thereof through coupling, by the coil mounting means, or by the electrodes of the cathode ray tube. There also may be geometric distortions due to the kinescope face not being on a radius from the deflecting coil. In the event that three kinescopes are used with a Schmidt projection system, it is necessary to center the images differently on the three tube faces whereby the distortions will be different and produce misregistry in portions of the scanning pattern.

The primary object of the present invention is to correct misregistry of the types abovementioned.

A related object is to control the relative linearity of scanning in a plurality of cathode ray tubes.

These objects are accomplished for horizontal deflection by inserting individual resistance in series with the respective horizontal deflecting coils, and for vertical deflection by inserting individual means providing reactance in series with the respective vertical deflecting coils. The former series combinations are connected in parallel with each other, and the latter series combinations are also connected in parallel with each other.

Other objects and advantages of the invention will become apparent from the following description in connection with the accompanying drawing in which.

In the several figures like reference characters indicate similar parts.

Figures 1, 2, 3:
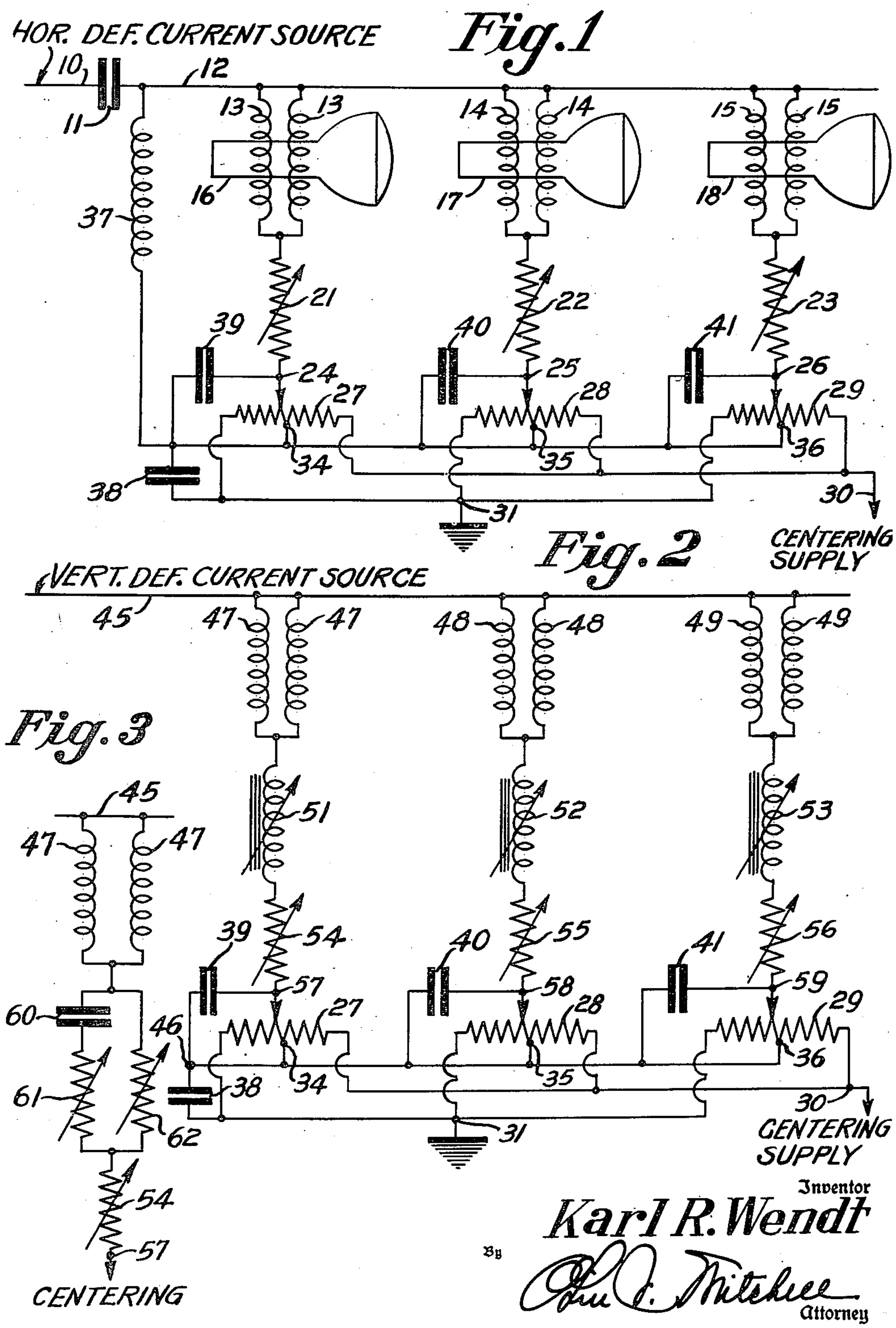
Figure 1 is a diagram of horizontal deflection circuits for three cathode ray tubes with horizontal linearity control according to the present invention.
Figure 2 is a diagram of vertical deflection circuits for the same cathode ray tubes with vertical linearity control according to the present invention.
Figure 3 illustrates a modification of Fig. 2.

Referring to Figure 1, reference character 10 indicates a source of horizontal deflection current which is applied through a coupling condenser 11 to a conductor 12 and thence to horizontal deflecting coils 13, 14, 15 for three cathode ray tubes 16, 17, 18 respectively. It is cutomary to divide a deflecting coil into two parts so that it can be disposed symmetrically relative to the tube axis, the coil parts being connected in series. While such a series connection may be used in circuits of the present invention, it is preferred to connect the parts of each deflecting coil in parallel as indicated in the drawing. For the purpose of this description, the two parts (whether connected in series or in parallel) are considered as one deflecting coil, such as 13, 14 or 15. The other ends of said coils are connected individually through variable series resistances 21, 22, 23 to adjustable taps 24, 25, 26 on potentiometers 27, 28, 29 respectively. Each of the potentiometers may be part of the usual centering control which provides means for centering the electron spot in its associated cathode ray tube. For a plurality of such tubes as contemplated herein, the potentiometers are connected in common at one end to a source of centering supply voltage 30 and are connected at their other ends in common to a point of fixed potential such as ground 31. Center taps 34, 35, 36 on the respective potentiometers 27, 28, 29 are connected in common and to one end of a choke coil 37, the other end of which is connected to the conductor 12. The coil 37 and condenser 11 provide a high-pass filter for the current from source 10. A by-pass condenser 38 is connected between the taps 34, 35, 36 and ground 31. Individual by-pass condensers 39, 40, 41 are connected between the respective adjustable taps 24, 25, 26 and the center taps 34, 35, 36.

In Figure 2 a conductor 45 connects vertical deflecting coils 47, 48, 49 in common to a source of vertical deflection current the other side of which may be connected to point 46. Such source may be, for instance, the secondary of a transformer (not shown). As stated above, each deflecting coil is shown in two parts connected in parallel but considered as one coil. The other ends thereof are connected through individual variable inductances 51, 52, 53 and individual variable resistances 54, 55, 56 which are connected respectively to adjustable taps 57, 58, 59 on individual centering means similar to the centering means described in connection with Fig. 1. The components of such centering means comprising potentiometers, by-pass condensers, centering supply, and ground, have been given the same reference characters as in Fig. 1 although the actual values of the components will differ in view of the widely different frequencies of the horizontal and vertical deflection circuits.

It should be understood that each cathode ray tube, such as 16, has associated therewith a horizontal deflecting coil, such as 13, and a vertical deflecting coil, such as 47. Ordinarily, the horizontal and vertical deflecting coils for a cathode ray tube are constructed as a unit, sometimes called a yoke, which can be positioned on the neck of the tube.

Figure 3 illustrates a modification of Fig. 2 and, for simplicity, shows only one deflection circuit, but it should be understood that a plurality of such circuits may be connected in parallel as illustrated in Fig. 2. The variable inductance 51 has been substituted in Fig. 3 by means comprising capacitative reactance which is preferably comprised of a condenser 60 and variable resistance 61 connected in series, and another variable resistance 62 shunting the series combination. This series-parallel combination 60, 61, 62 is connected in series between vertical deflecting coil 47 and variable resistance 54. Otherwise the circuit of Fig. 3 is like those of Fig. 2, and a plurality of such circuits may be connected to individual centering controls in the same manner.

The operation of a plurality of cathode ray tubes having horizontal and vertical deflecting coils connected according to the circuits shown in the drawing will now be described. In my copending application Serial No. 46,963 mentioned above, the advantages of connecting such deflecting coils in parallel has been disclosed, and such parallel connections also are employed in the present invention. The variable resistances 21, 22, 23 in series with the respective horizontal deflection coils have been found effective to modify the linearity of the sawtooth wave and thereby correct misregistry within the scanning pattern such as described above. Each variable resistance may be small, a maximum of 6 ohms having been found to be effective for such corrections. After the scanning patterns of the respective cathode ray tubes have had their four corners brought into registry, the misregistry within the resulting pattern is corrected by adjusting one or more of the resistances 21, 22 or 23. Inasmuch as a horizontal deflecting coil is predominantly inductive the addition of such a resistance in series therewith will cause only slight changes in deflection amplitude and will therefore only slightly affect the width of the scanning pattern.

In order to correct misregistry in the vertical direction, a series reactance is adjusted. Such reactance may be inductive as shown in Fig. 2 or capacitative as shown in Fig. 3. By varying one or more of the inductances 51, 52, or 53, the high-frequency components of the sawtooth wave immediately following retrace are modified thereby changing mostly the upper portion of the scanning pattern. With the arrangement of Fig. 3 the variable resistance 61 in series with condenser 60 control the high frequency or upper portion of the scanning pattern, whereas resistance 62 controls the low frequency or lower portion thereof. These results are obtained by using a reactance because a vertical deflecting circuit is predominantly resistive and therefore the addition of reactance thereto will vary the linearity to a small extent without materially changing the height of the scanning pattern. Said height is controlled by the series variable resistances 54, 55, 56 which have no appreciable effect on linearity.

Hence, by using the adjustable circuit elements as described, the scanning patterns of a plurality of cathode ray tubes can be brought into substantial registry over their entire area, provided of course that the four corners of the scanning patterns are first registered. The centering controls shown in the drawing are employed for shifting one or more of the entire scanning patterns either up or down or to the right or left as may be necessary.

The arrangements shown in the drawing are merely illustrative of the invention and one use thereof, it being obvious that changes and modifications may be made to suit other uses and requirements.

What is claimed is:

1. Apparatus adapted to aid in registering the scanning patterns in a plurality of cathode ray tubes comprising in combination a plurality of horizontal deflecting coils, an impedance connected in series with each of said horizontal deflecting coils, said impedances being of such character that the voltage appearing across their terminals is substantially in phase with the horizontal deflection currents flowing between its terminals, said series combination being connected in parallel, a plurality of vertical deflection coils, and an impedance connected in series with each of said vertical deflecting coils, each of said latter impedances being of such character that the voltage appearing across their terminals is substantially ninety degrees out of phase with the vertical deflection currents flowing between the terminals, said latter series combinations also being connected in parallel.

2. A combination as defined by claim 1 wherein said means providing reactance are inductive and individually variable.

3. A horizontal deflection circuit for a plurality of cathode ray tubes the scanning patterns of which are to be registered, comprising a horizontal deflecting coil for each tube, means connecting one end of said coils in common, a variable impedance connected to other end of each coil, said impedance being of such character that the voltage across its terminals is substantially in phase with the horizontal deflection current flowing between its terminals, and individual centering means respectively connected to the other end of said impedances.

4. A horizontal deflection circuit according to claim 3 in which a source of horizontal deflection voltage is connected to said coils, and individual adjustable sources of centering voltage are connected to each of said impedances.

5. A horizontal deflection arrangement for a plurality of cathode ray tubes the scanning patterns of which are to be registered, comprising a source of horizontal deflecting current, a centering supply, and a plurality of deflecting circuits connected in parallel between said source and said supply, each said circuit comprising a deflection coil, an impedance of such character that the voltage appearing across such terminals is substantially in phase with the horizontal deflection current flowing between its terminals, and a centering potentiometer, all connected in series.

6. A vertical deflection circuit for a plurality of cathode ray tubes the scanning patterns of which are to be registered, comprising a vertical deflecting coil for each tube, means connecting one end of said coils in common, an impedance of such character that the voltage across its terminals is sufficiently in phase quadrature with the current flowing between its terminals connected to the other end of each coil, and individual centering means respectively connected to said reactive means.

7. A vertical deflection circuit according to claim 6, a common source of deflecting current for said coils, and a centering supply connected in common to said centering means.

8. A vertical deflection circuit according to claim 6 wherein each said impedance is an inductance.

9. A vertical deflection circuit according to claim 6 wherein each said impedance having a reactive component comprises a series combination of capacity and variable resistance shunted by another variable resistance.

10. A vertical deflection arrangement for a plurality of cathode ray tubes the scanning patterns of which are to be registered, comprising a source of vertical deflecting current, a centering supply, a plurality of deflecting circuits connected in parallel between said source and said supply, each said circuit comprising a deflecting coil, an impedance of such character that the voltage across its terminals is sufficiently in phase quadrature with the current flowing between its terminals, a width-control variable resistance, and a centering potentiometer, all connected in series.

11. In combination, a cathode ray tube, horizontal and vertical deflecting coils therefor, an impedance of such character that the voltage appearing across its terminals is sufficiently in phase with the current flowing between these terminals connected in series with said horizontal deflecting coil, and an impedance of such character that the voltage appearing across its terminals is sufficiently in phase quadrature with the vertical deflection current flowing between its terminals connected in series with said vertical deflecting coil.

12. A plurality of combinations according to claim 11 and means connecting all of the series combinations of horizontal coils and the corresponding impedances in parallel with each other, and means connecting all of the series combinations of vertical coils and corresponding impedances in parallel with each other.

13. A horizontal deflection circuit comprising in combination a deflection coil, an impedance having a characteristic such that the voltage across its terminals is substantially in phase with the deflection current passing between its terminals, and a source of centering potential, said deflection coil, said impedance and said source of centering potential being connected in series.

14. A vertical deflection circuit comprising in combination a vertical deflection coil, an impedance having a characteristic such that the voltage across its terminal is substantially in phase quadrature with the vertical deflection currents passing between said terminals, and a source of centering potential, said coil, impedance and source being connected in series.

KARL RINNER WENDT.

REFERENCES CITED

The following references are of record in the file of this patent:

UNITED STATES PATENTS

| Number | Name | Date |
|---|---|---|
| 1,390,727 | Schenkel | Sept. 13, 1921 |
| 2,223,990 | Holmes | Dec. 3, 1940 |
| 2,280,733 | Tolson | Apr. 21, 1942 |
| 2,369,631 | Zanarini | Feb. 13, 1945 |
| 2,414,939 | Fitch | Jan. 28, 1947 |
| 2,440,418 | Tourshou | Apr. 27, 1948 |
| 2,443,030 | Foster | June 8, 1948 |
| 2,447,804 | Holst | Aug. 24, 1948 |
| 2,454,378 | Forgue | Nov. 23, 1948 |
| 2,455,456 | Whittaker | Dec. 7, 1948 |
| 2,457,911 | Munster | Jan. 4, 1949 |